March 13, 1928. Re. 16,898

O. W. BREDBURY

LOOSENING ROLL FOR CARDING MACHINES

Original Filed Nov. 11, 1922 2 Sheets-Sheet 1

INVENTOR.
Owen W. Bredbury
BY
Gardner W. Pearson
ATTORNEY.

March 13, 1928. Re. 16,898

O. W. BREDBURY

LOOSENING ROLL FOR CARDING MACHINES

Original Filed Nov. 11, 1922 2 Sheets-Sheet 2

INVENTOR.
Owen W. Bredbury
BY
Gardner W. Pearson
ATTORNEY.

Reissued Mar. 13, 1928. Re. 16,898

UNITED STATES PATENT OFFICE.

OWEN W. BREDBURY, OF READING, MASSACHUSETTS.

LOOSENING ROLL FOR CARDING MACHINES.

Original No. 1,598,800, dated September 7, 1926, Serial No. 600,425, filed November 11, 1922. Application for reissue filed September 27, 1927. Serial No. 222,392.

My invention relates to cards and, particularly, to woolen cards.

It is well known that such cards generally consist of a main cylinder or swift with teeth formed of bent wire which pitch forward, and a series of workers with similar teeth which pitch in the same direction so that the teeth come together point to point, together with a series of strippers each of which is intended to clear the stock from the worker and transfer it back to the main cylinder.

In addition to this there is a fancy, which is substantially a large wire brush with long wire teeth, which travels at a faster surface speed than the main cylinder and brushes up the stock so that it can be removed by a doffer. The teeth of the fancy are set close to those on the main cylinder but do not enter in between them.

The teeth on such cards fill up with stock and waste material of various kinds and it is necessary from time to time to stop the card and by hand to clean out the teeth of the workers and of the main cylinder.

The purpose of my invention is to agitate the stock and dirt below the points of the teeth of the main cylinder or the doffer so that it will be loose and so that it will not be necessary to clean or strip the rolls as frequently.

I am aware that the attempt has been made to use a roll having more or less pins projecting from the surface, such pins being rigid, and that the attempt has been made to locate such roll in various positions, and I do not claim broadly such a construction.

What I do claim, however, is that I am the first to successfully devise such a roll with yielding needles which project substantially in a radial direction and are so set that they penetrate between the teeth on the main cylinder or the doffer.

Preferably, I use needles with points which taper gradually from their bases to their tips, instead of the shovel-pointed teeth or chisel-pointed teeth generally used on such cards. I also prefer to give my loosening roll an axial traverse motion and a faster surface speed than the cylinder to be cleaned, both of which help to loosen the material below the points of the teeth and allow it to be carried along by the next roll or to drop out.

I prefer to use spring needles set in an elastic foundation but may use rigid needles set in an elastic foundation or spring needles set in a rigid foundation.

When properly made and adjusted, I do away entirely with the necessity of stopping the card to strip it, and my spring needles themselves do not break and do not bend nor wear out the teeth of the main cylinder or other roll.

I prefer to have relatively few pins and widely separated so that they will not clog up and it will not be necessary to clean them.

In the drawings, Fig. 1 is a diagrammatic side elevation of a card with my preferred form of device in one position thereon.

Figure 1:
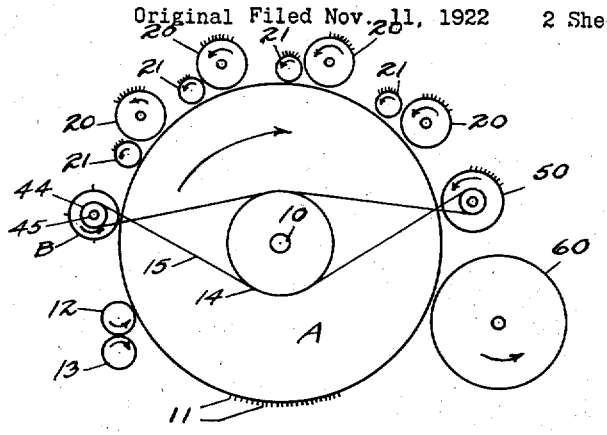

In the drawings, A represents the main cylinder of a woolen card carried by a shaft such as 10 and being covered with card clothing 100 having teeth 11 which pitch forward, that is, from left to right in the direction of the movement of the main cylinder which at the top is from left to right. I will call this, teeth which pitch forward and will say that the main cylinder, and any other roll traveling in the same direction, travels forward, while those which travel in the opposite direction, I will say, travel backward.

The stock is fed to the main cylinder in any usual manner as by feed rolls 12 and 13 running in the direction of the arrows.

Around the top part of the main cylinder A, I locate a number of workers shown in Fig. 1 as four, indicated at 20, 20, 20, 20, each of such workers being shown as traveling backward and having teeth which pitch forward. Associated with each worker 20 is a stripper 21 which travels backward and which has teeth which pitch backward.

50 represents a fancy roll of the usual type having long straight wire teeth, and 60 represents the doffer, also of the usual type.

Figure 2:
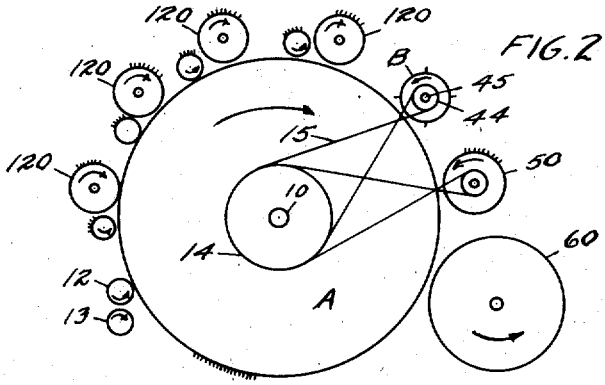
Fig. 2 is a similar diagrammatic side elevation showing my device applied in another position.
Figure 3:
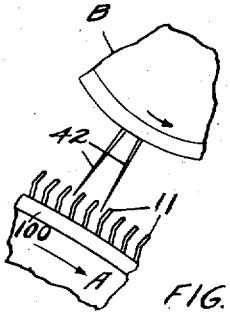
Fig. 3 is a detail side elevation showing two rows of my needles and how they enter between the teeth of the main cylinder.

In Fig. 2, the workers 120, 120, 120, 120, are shown as traveling forward and as having teeth which pitch forward.

The main feature of my invention consists of the loosening roll B which is shown in Fig. 1 as located in place of or before the first worker, and in Fig. 2 as located between the last worker and the fancy 50. In both cases it is carried by a shaft 45 supported in suitable bearings I, K, and is capable of sliding in such bearings axially when moved by a traverse motion to be described.

The drive of this roller is shown as a pulley 14 carried by shaft 10 connected by a belt 15 with a smaller pulley 44 carried by shaft 45, the relation of the parts being such that, preferably, the surface speed of roll B is 25% greater than that of the main cylinder and in the same direction at the point where they are in the closest proximity.

This roller B is shown as having one or more rows of pointed needles such as 42, 81, 82, 170, 91, 181. These needles, preferably, taper from base to point and may be so arranged that there will be two connected by a bar at their bases in the form of a staple, as shown in Fig. 6.

Figure 6:
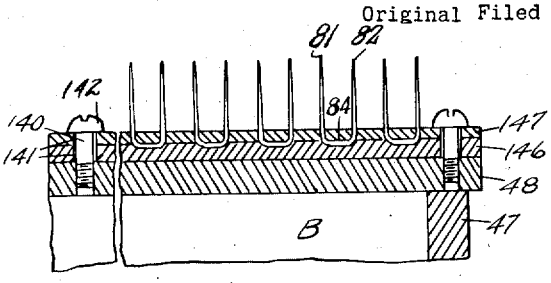
Fig. 6 is a section of Fig. 5 on line 6—6.

As shown in Fig. 6, I prefer to form each roll with heads such as 47 upon which is built the curved surface 48 which may be of wood or other similar material.

Figure 4:
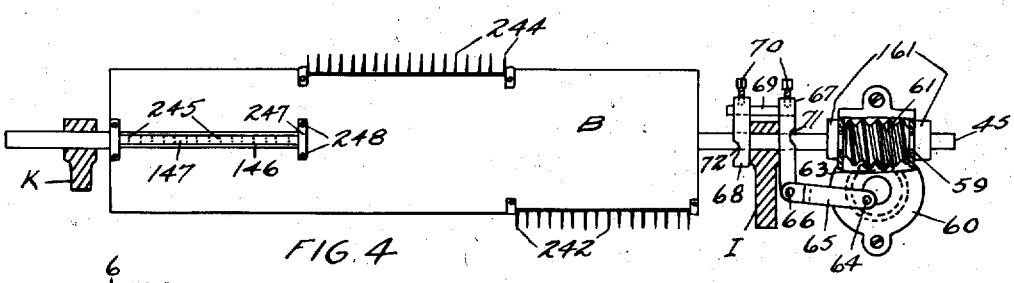
Fig. 4 is an elevation of my roll with its traverse motion, some parts being broken away.
Figure 5:
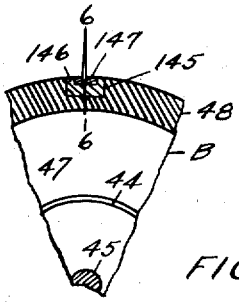
Fig. 5 is a sectional elevation showing my preferred method of attaching my needles to a roll.
Figure 8:
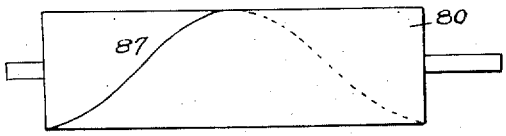
Fig. 8 is a diagrammatic elevation showing one manner of arranging my line of needles.
Figure 9:
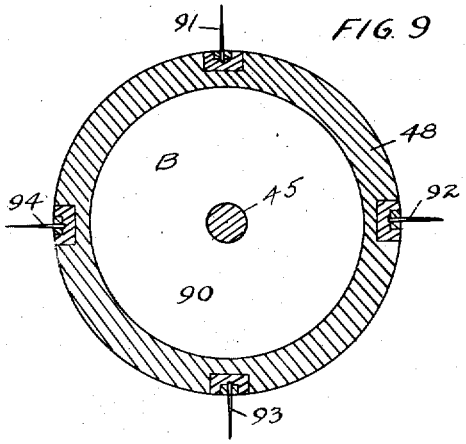
Fig. 9 is a vertical sectional elevation of a roll with four single rows of needles.

Each row of pins is, preferably, held in position by being passed through a strip of brass 147 which is imbedded in a rubber base 146, which rubber base is imbedded in a groove or slot 145 in the surface 48. This construction allows the pins to give slightly in a radial direction. As shown in Fig. 4, the rows of pins, such as 244, 245 and 246, may be in staggered relation or, as shown in Fig. 8, a single row of pins, such as 87, may wind around a cylinder, such as 80, in a spiral form or, as shown in Fig. 9, there may be single rows of pins 91, 92, 93 and 94 running parallel to each other and to the cylinder 90, such rows being ninety degrees apart.

Figure 7:
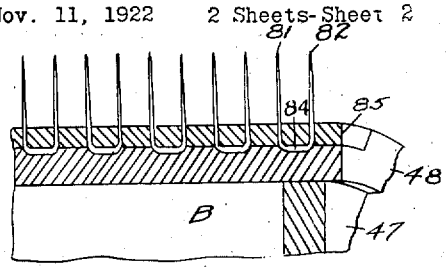
Fig. 7 is a perspective section similar to Fig. 6 showing a slight modification of the method of attaching my needles.

As shown in Fig. 7, instead of a brass strip imbedded in rubber, I may use a fillet of the ordinary card clothing foundation 85 one-half inch to one inch in width, between which staples, having legs 81, 82 with a connecting bar 84, are passed. This fillet may be glued in place.

In any case my rows of flexible pins should be widely separated by bare spaces.

I prefer to give my roll a traverse motion by means such as shown in Fig. 4 including a case 60 having a bearing hole 59 for shaft 45 of roll B. Fixed to shaft 45 on each side of case 60 are collars 161 which revolve with shaft 45 and cause case 60 with gear 63 to move axially with shaft 45. Worm 61 is fixed to shaft 45 and engages a gear 63 revoluble in case 60 to which, at 64, is pivoted a rocking arm 65. This arm at 66 is pivoted to an arm 67 which is connected to another arm 68 by a bar 69 and set screws 70. Through these arms 67 and 68 are the holes 71 and 72 for shaft 45 and they extend on each side of the fixed bearing member I.

As the shaft 45 is caused to revolve as by pulley 44, the action of the worm 61 on gear 63 is such that shaft 45 and roll B are caused to traverse back and forth axially.

My needles and their foundation are, preferably, both resilient or elastic, but one or the other must be yielding. I may cement or glue my brass strip to the rubber backing and the backing to the roll, but I prefer also to fasten them by additional means.

In Fig. 6, I provide holes 141 in the strip 147 smaller than the head 142 but larger than the shank 140 of a fastening screw which goes through such holes, the rubber 146 and into the roll B.

In Fig. 4, I show metal cross bands 247 fastened to roll B by screws 248, 248.

Figure 10:
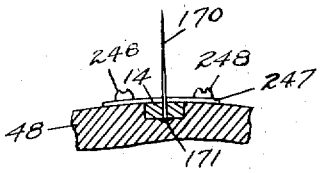
Fig. 10 is a detail showing a modified type of needle and manner of attaching to the roll.
Figure 13:
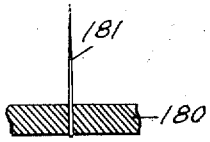
Fig. 13 is a detail sectional view showing a modified type of pin and method of attaching it to the roll.

In Fig. 10, I show a single shanked needle 170 with a head 171 passing through a strip 149 held in place by metal bands 247 and screws 248. Strip 149 may be of rubber or other resilient material, or wood or metal if the needles are springing. If a wooden strip 180 is used, as shown in Fig. 13, I may drive tapered needles 181 through it from the back.

Figure 11:
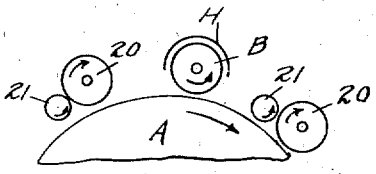
Fig. 11 is a diagrammatic detail showing another location for my device.

In Fig. 11, I show my roll B located in place of one of the intermediate workers instead of in place of the last worker, and as being provided with a removable cover H which directs any flyings back to the main cylinder.

Figure 12:
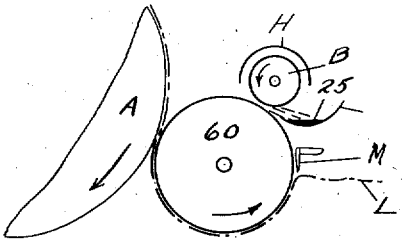
Fig. 12 is a diagrammatic side elevation showing my device applied to a doffer.

In Fig. 12, I show my roll B applied to the top of a doffer. In this location, as the fleece L has been removed by the comb M, leaving only dirt 25 at the top, my roll B kicks out this dirt as shown.

I prefer to use a cover H and a pan N to receive this dirt.

The needles should be tapered, of fine wire, yielding, and arranged in rows, while the roll should have a traverse motion and should also travel at a greater surface speed than the roll, the stock upon which is to be loosened and cleaned, in order to get the best results.

On a first breaker card, I prefer to locate my roll next the fancy as shown in Fig. 2 because the stock is in better condition than when it is first fed from the feed box, and any flyings will be worked in and evened in the next carding.

On the finisher, or on any card to which the stock is fed in the form of a lap or fiber mass of substantially uniform size, weight and consistency, however, I prefer the location next the breast or feed rolls, as shown in Fig. 1, as the stock at this point is even, and the stock which my roll loosens will be reworked by the workers before it is finally taken from the card.

When my loosening roll is used, there is less waste of fiber as it is carried along in the fleece, but the dirt, if dry, drops off at the bottom of the main cylinder or, if it is greasy, some settles to the bottom of the card clothing teeth and must infrequently be stripped out by hand.

I claim:

1. In a carding machine having a main cylinder covered with card clothing having wire teeth, workers, strippers and a doffer, the combination of a loosening roll having a longitudinal groove, an elastic strip imbedded in said groove, a metal strip imbedded in the elastic strip, yielding tapering needles carried by the metal strip, and means to retain the strip flexibly in position, the loosening roll being so set that the needle points penetrate between said wire teeth, with means to give the loosening roll an axial traverse motion, and means to cause the loosening roll to revolve in the opposite direction to, and at a greater surface speed than, the main cylinder.

2. In a carding machine having a main cylinder covered with card clothing having wire teeth, workers, strippers and a doffer, the combination of a loosening roll having a longitudinal groove, an elastic strip imbedded in said groove, a metal strip imbedded in the elastic strip, yielding tapering needles carried by the metal strip, and means to retain the strip flexibly in position, the loosening roll being so set that the needle points penetrate between said wire teeth, with means to give the loosening roll an axial traverse motion.

3. In a carding machine; the combination with a main cylinder revoluble clockwise and covered with card clothing having wire teeth, means to feed the stock thereto, means to work the stock thereon, and doffing means to remove the stock therefrom; of a loosening roll having yielding needles projecting from its surface said roll being positioned between the feeding and working means and revoluble anti-clockwise and at a faster surface speed than the main cylinder, and means to give the loosening roll an axial traverse motion.

4. The combination in a lap working card having means to feed a fiber lap to a main cylinder, and said main cylinder covered with card clothing having teeth which rake forward and which travels forward, and having a plurality of means to work the fiber with the main cylinder and positioned ahead of the lap feeding means; of a loosening roll having a plurality of widely separated rows of yielding needles said rows of needles being widely separated by bare spaces, said roll being positioned between the lap feeding means and the first of the lap working means and being so set that the points of the needles penetrate between the points of the teeth on the main cylinder; means to cause the loosening roll to revolve in the opposite direction to and at a greater surface speed than the main cylinder; and means to give the loosening roll an axial traverse motion.

5. The combination in a lap working card having means to feed a fiber lap to a main cylinder, and said main cylinder covered with card clothing having teeth which rake forward and which travels forward, and having a plurality of means to work the fiber with the main cylinder and positioned ahead of the lap feeding means; of a loosening roll having a plurality of widely separated rows of yielding needles said rows of needles being widely separated by bare spaces, said roll being positioned between the lap feeding means and the first of the lap working means; and means to cause the loosening roll to revolve in the opposite direction to and at a greater surface speed than the main cylinder.

6. In a carding machine, a main cylinder bearing teeth, feeding means and stock working means, a loosening roll carrying yielding teeth, said loosening roll being located between the feeding and stock working means, and so positioned that its teeth penetrate between the teeth of the main cylinder, means to revolve the main cylinder and means to revolve said loosening roll at a greater surface speed than the surface speed of the main cylinder and in the opposite direction thereto.

7. In a carding machine, a main cylinder bearing teeth, feeding means and stock working means, a loosening roll carrying yielding teeth projecting therefrom in one or more rows with adjacent bare spaces of substantial area, said loosening roll being located between the feeding means and the stock working means and so positioned that its teeth penetrate between the teeth of the main cylinder, means to revolve the main cylinder and means to revolve the loosening roll at a greater surface speed than the surface speed of the main cylinder and in the opposite direction thereto.

8. In a carding machine, a main cylinder bearing teeth, feeding means and stock working means, a loosening roll carrying yielding teeth, said loosening roll being located between the feeding means and stock working means and so positioned that its teeth penetrate between the teeth of the main cylinder, means to give said loosening roll an axial traverse motion, means to revolve the main cylinder and means to revolve the loosening roll at a greater surface speed than the surface speed of the main cylinder and in the opposite direction thereto.

9. In a carding machine, a main cylinder bearing teeth, feeding means and stock working means, a loosening roll with yielding teeth projecting therefrom in one or more rows with adjacent bare spaces of substantial area, said loosening roll being located between the feeding means and stock working means and so positioned that its teeth penetrate between the teeth of the main cylinder, means to give said loosening roll an axial traverse motion, means to revolve the main cylinder and means to revolve the loosening roll at a greater surface speed than the surface speed of the main cylinder and in the opposite direction thereto.

10. In a carding machine, a main cylinder bearing teeth, means to revolve said cylinder, a loosening roll with teeth or needles mounted in a flexible foundation and projecting therefrom in one or more rows with adjacent bare spaces of substantial area, said loosening roll being so positioned that its teeth or needles penetrate between the teeth of the main cylinder and engage the stock carried thereby during the rotation of said cylinder, and means to revolve said loosening roll at a faster surface speed than the main cylinder and in the opposite direction thereto.

11. In a carding machine, a main cylinder bearing teeth, means to revolve said cylinder, a loosening roll with teeth or needles flexibly mounted and projecting therefrom in one or more rows with adjacent bare spaces of substantial area, said loosening roll being located between the feeding means and the stock working means and so positioned that its teeth or needles penetrate between the teeth of the main cylinder during the rotation of said cylinder, means to revolve said loosening roll at a faster surface speed than the main cylinder and in the opposite direction thereto, and means to give said loosening roll an axial traverse motion.

12. In a carding machine, a main cylinder bearing teeth, feeding means and stock working means, means to revolve said main cylinder, a loosening roll with one or more rows of yielding needles or teeth projecting radially therefrom, said roll being located between the feeding means and the stock working means and so positioned that its needles or teeth penetrate between the teeth of the main cylinder, and means to revolve said loosening roll at a greater surface speed than the main cylinder and in the opposite direction thereto.

Signed at Lowell, Massachusetts, this twenty-first day of September, 1927.

OWEN W. BREDBURY.